United States Patent [19]
Dartey et al.

[11] Patent Number: 6,123,978
[45] Date of Patent: Sep. 26, 2000

[54] STABLE SALAD DRESSINGS

[75] Inventors: Clemence K. Dartey, Itheca, N.Y.; John D. Higgins, III, Ft. Washington, Pa.; Richard D. Bruce, Rydal, Pa.; Brid T. Burruano, King of Prussia, Pa.

[73] Assignee: McNeil-PPC, Inc., Skillman, N.J.

[21] Appl. No.: 09/143,817

[22] Filed: Aug. 31, 1998

[51] Int. Cl.$^7$ .................................................. A23D 9/007
[52] U.S. Cl. .......................................... 426/602; 426/611
[58] Field of Search ..................................... 426/601, 611

[56] References Cited

U.S. PATENT DOCUMENTS

| | | |
|---|---|---|
| 3,004,043 | 10/1961 | Stern . |
| 3,085,939 | 4/1963 | Wruble et al. . |
| 3,203,862 | 8/1965 | Jones . |
| 3,751,569 | 8/1973 | Erickson . |
| 3,865,939 | 2/1975 | Jandacek ................................ 424/238 |
| 3,881,005 | 4/1975 | Takkar et al. . |
| 4,160,850 | 7/1979 | Hallstrom et al. . |
| 4,195,084 | 3/1980 | Ong ........................................ 424/238 |
| 4,238,520 | 12/1980 | Miller et al. . |
| 4,273,790 | 6/1981 | Bosco et al. . |
| 4,443,487 | 4/1984 | Darling . |
| 4,588,717 | 5/1986 | Mitchell ................................. 514/170 |
| 4,705,875 | 11/1987 | Mitchell ................................... 556/46 |
| 4,714,566 | 12/1987 | Takahashi et al. . |
| 4,808,334 | 2/1989 | Ezaki et al. . |
| 4,849,222 | 7/1989 | Broaddus . |
| 4,883,788 | 11/1989 | Day et al. . |
| 4,952,413 | 8/1990 | LaBarge et al. . |
| 5,082,684 | 1/1992 | Fung . |
| 5,135,768 | 8/1992 | Campbell et al. . |
| 5,158,798 | 10/1992 | Fung et al. . |
| 5,215,769 | 6/1993 | Fox et al. . |
| 5,244,887 | 9/1993 | Straub ..................................... 514/182 |
| 5,306,514 | 4/1994 | Letton et al. . |
| 5,306,515 | 4/1994 | Letton et al. . |
| 5,306,517 | 4/1994 | Norton et al. . |
| 5,308,639 | 5/1994 | Fung . |
| 5,332,595 | 7/1994 | Gaonkar . |
| 5,338,563 | 8/1994 | Mikulka et al. . |
| 5,427,815 | 6/1995 | Ferenz . |
| 5,472,728 | 12/1995 | Miller et al. . |
| 5,502,045 | 3/1996 | Miettinen ............................... 514/182 |
| 5,532,019 | 7/1996 | Miller et al. . |
| 5,718,969 | 2/1998 | Sewall et al. . |
| 5,747,464 | 5/1998 | See . |
| 5,756,142 | 5/1998 | Reckweg et al. . |
| 5,770,254 | 6/1998 | Izzo et al. . |
| 5,897,905 | 4/1999 | Bialek et al. ........................... 426/602 |
| 5,932,562 | 8/1999 | Ostlund .................................... 514/78 |
| 5,958,913 | 9/1999 | Miettenen .............................. 514/182 |
| 5,965,449 | 10/1999 | Novak ...................................... 436/71 |
| 6,025,010 | 2/2000 | Reddy ..................................... 426/603 |
| 6,025,348 | 2/2000 | Goto et al. ............................. 514/182 |
| 6,031,118 | 2/2000 | Van Amerongen ...................... 552/554 |

FOREIGN PATENT DOCUMENTS

| | | |
|---|---|---|
| 928140 | 6/1973 | Canada ..................................... 99/165 |
| 0 771 531 A2 | 7/1997 | European Pat. Off. . |
| 0 897 671 | 2/1999 | European Pat. Off. ......... A23D 7/00 |
| 0 897 970 | 2/1999 | European Pat. Off. .......... C11C 3/10 |
| 0 911 385 | 4/1999 | European Pat. Off. .......... C11C 3/00 |
| 0 947 197 | 10/1999 | European Pat. Off. ..... A61K 31/575 |
| 29708205 U1 | 8/1997 | Germany . |
| 1 284 814 | 8/1972 | United Kingdom . |
| 1 413 102 | 11/1975 | United Kingdom . |
| 1 598 638 | 9/1981 | United Kingdom . |
| 98/06405 | 2/1998 | WIPO . |
| 98/19556 | 5/1998 | WIPO . |
| WO 99/56729 | 11/1999 | WIPO .............................. A61K 9/14 |
| WO 99/63841 | 12/1999 | WIPO .............................. A23L 1/03 |

OTHER PUBLICATIONS

Mattson 1977 Effect of Plant Sterol esters on the Absorption of Dietary Cholesterol J Nutr 107:1139–1146.
Farquhar 1958 Circulation vol. XVII p. 890–899.
Mattson 1977 Nutrition 107:1139–1146.
Gylleng 1994 Diabetologia 37:773–780.
Miettinen 1995 The New England Journal of Medicine 333:1308–1312.
Slover et al., "Lipids in Margarines and Margarine–Like Foods", JAOCS, vol. 62, Apr. 1995.
Westrate and Meijer, "Plant sterol–enriched margarines and reduction of plasma total–and LDL–cholesterol concentrations in normocholesterolaemic and mildly hypercholesterolaemic subjects", Eur. J. of Clin. Nut., 1998.

*Primary Examiner*—Carolyn Paden

[57] ABSTRACT

The present invention provides a stable foodstuffs which contain a cholesterol lowering amount of a sterol or stanol ester, crystal fat inhibitors and emulsifiers. The foodstuffs, including salad dressings are stable even when refrigerated.

13 Claims, No Drawings

STABLE SALAD DRESSINGS

FIELD OF THE INVENTION

This invention relates to stable salad dressings containing a sterol ester and methods of producing the same.

BACKGROUND OF THE INVENTION

It has been shown that the addition of plant sterols, such as β-sitosterol, to diets will reduce serum cholesterol levels. The sterols reduce serum cholesterol through the disruption of intestinal absorption of dietary cholesterol by displacing it from bile acid micelli. More recently, β-sitosterol's saturated derivative, β-sitostanol, has been shown to be more effective in the reduction of intestinal cholesterol absorption. The sitostanol itself is virtually unabsorbed, so it does not contribute at all to in vivo serum sterol concentration upon consumption. Unfortunately, typical sterols and stanols are insoluble in the micelli phase of the alimentary canal and have only limited solubility in oils and/or fats or water. Hence, free sterols or stanols themselves are not optimum candidates for use in typical pharmaceutical or dietary dosage forms as cholesterol reducing agents.

The incorporation of these materials into foods are also difficult due to the limited solubility of the stanol or sterol in foods such as margarine and salad dressings. Salad dressings are particularly difficult in that they are frequently sold at room temperature, but require refrigeration after opening. Formulating a stable composition is particularly difficult when changes in temperature occur.

SUMMARY OF THE INVENTION

The present invention is directed to a stable food containing a cholesterol reducing amount of a sterol ester; an effective amount of a fat crystal inhibitor, and an effective amount of a hydrocolloid stabilizer or emulsifier. In a particularly preferred embodiment the present invention is a salad dressing which remains stable even when refrigerated.

DETAILED DESCRIPTION

As disclosed in U.S. Pat. Nos. 5,502,045, 5,578,334 and 5,244,877, the contents of which are incorporated herein by reference, it is known that consumption of β-sitosterol is known to reduce cholesterol levels in the blood stream. In order to be effective it is necessary to consume from about 0.5 to about 1.5 grams, and more preferably about 1 gram of β-sitosterol per serving size. The word sterol ester as used in the present invention is understood to include any cholesterol lowering agent including stanols, stanol esters, sterol esters and the like.

In order to incorporate an effective amount of β-sitosterol in a salad dressing, in which an average serving size of about 30 grams, it is necessary to incorporate less than about 10 percent by weight, typically less than about 8 percent and most preferably about 6 percent by weight of the β-sitosterol in a salad dressing serving.

At this relatively high level of β-sitosterol, it is difficult to formulate a stable product, especially after the product has been opened and requires refrigeration. Refrigeration as used herein, is understood to be temperatures below room temperature, which includes about 60 F., but the term also includes temperatures of 40 F. and below. These lower temperatures are commonly found in commercial and residential refrigerators.

As used throughout this application, stable is understood to mean that the product does not separate into different phases. Instead the food, most preferably the salad dressing, will be relatively uniform and not separate into distinct layers. An example of a stable system is a salad dressing which remains creamy after a period of time. An example of an unstable system is an Italian salad dressing which after the passage of some time will separate into two distinct regions, an oil phase and an aqueous phase.

The present invention requires the incorporation of an effective amount of fat crystal inhibitors which include polyglycerol esters of fatty acids, sorbitan esters of fatty acids such as sorbitan tristearate; polysorbates made from the reaction product of monoglycerides or sorbitan esters with ethylene oxides, mixtures of these materials and the like. Examples of useful polysorbates include polyoxyethylene 20 mono- and diglycerides of saturated fatty acids, polyoxyethylene 4 sorbitan monostearate, polyoxyethylene 20 sorbitan tristearate, polyoxyethylene 20 sorbitan monooleate, polyoxyethylene 5 sorbitan monooleate, polyoxyethylene 20, sorbitan trioleate, sorbitan monopalmitate, sorbitan monolaurate, propylene glycol monolaurate, glycerol monostearate, diglycerol monostearate, glycerol lactylpalmitate; mono and di-glyerides and the like. A particularly preferred fat crystal inhibitor is Caprol ET, commercially available from A. C. Humko, which is a mixture of polyglycerol fatty acid esters. Typically these materials are incorporated at levels of from 0.1 to about 3.0 percent by weight, preferably from about 0.2 to about 2.0 and most preferably about 0.5 weight percent.

Useful emulsifiers in the practice of the present invention include polyglycerol esters, mono and diglycerides of fatty acids, propylene glycol esters, sucrose fatty acid esters and polyoxyethylene derivatives of sorbitan fatty acid esters and the like. Mixtures of emulsifiers may also be employed. These emulsifiers are well known in the art and are commercially available. The emulsifier level is typically from about 0.01 to about 1.5 weight percent, preferably from about 0.1 to about 1.2 and most preferably from about 0.5 to about 1.0 weight percent.

Suitable polyglycerol esters include triglyceryl monostearate, hexaglyceryl distearate, hexaglyceryl monopalimate, hexaglyceryl dipalmitate, decaglyceryl distearate, decaglyceryl monoleate, decaglyceryl dioleate, decaglycerol monopalmitate, decaglycerol dipalmitate, decaglyceryl monostearate, octaglycerol monoleate, octaglycerol monostearate and decaglycerol monocaprylate.

Other suitable emulsifiers include, with HLB values provided in brackets, [ ], include decaglycerol monolaurate [15.5]; decaglycerol distearate [10.5]; decaglycerol dioleate [10.5]; decaglycerol dipalmitate [11.0]; decaglycerol monostearate [13.0]; decaglycerol monooleate [13.5]; hexaglycerol monostearate [12.0]; hexaglycerol monooleate [10.5]; hexaglycerol monoshortening [12.0]; polyoxyethylene (20) sorbitan monolaurate [16.7]; polyoxyethylene (4) sorbitan monolaurate [13.3]; polyoxyethylene (20) sorbitan monopalmitate [15.6]; polyoxyethyLene (20) sorbitan monostearate [14.9]; polyoxyethylene (20) sorbitan tristearate [10.5]; polyoxyethylene (20) sorbitan monooleate [15.0]; polyoxyethylene (5) sorbitan monooleate [10.0]; polyoxyethylene (20) sorbitan trioleate [11.0]. As is appreciated by those with skill in the art, the HLB value for a surfactant is an expression of its Hydrophile-Lipophile balance, i.e., the balance of the size and strength of the hydrophilic (polar) and lipophilic (non-polar) groups of the surfactant.

Lactic acid derivatives include sodium stearoyl lactylate and calcium stearoyl lactylate.

In addition to emulsifiers, hydrocolloids may also be used to stabilize the emulsion at the same levels as the emulsifiers. Suitable hydrocolloids include xantham gum, propylene glycol alginate, guar gum, gum Tragarcanth, locust bean gum, gellan gum, gum Arabic, cellulose gums, cellulose derivatives such hydroxymethylpropyl cellulose, carboxymethyl cellulose, microcrystalline cellulose and the like; modified food starches and the like. In a preferred embodiment, both an emulsifier and hydrocolloid are employed.

Hydrocolloids are commonly used in combination with whole egg, egg yolks as well as the emulsifiers set forth above. The preferred stabilizers are combinations of xantham gum, propylene glycol alginate, egg yolk and modified food starches. However it was discovered that the incorporation of stanol esters in the formulations caused crystallization at temperatures below about 65 F. The destabilization of the emulsion was particularly noted when the amount of egg yolk was limited. In order to have the product defined as cholesterol free, egg yolk in the formulations was limited to less than 2 milligrams per serving.

The foods of the present invention also include preservatives, colorings, vitamins, seasonings and excipients which are well known to those in the art.

The present invention also provides a method for preparing a stable food emulsion comprising: providing an aqueous stream; providing an food grade acceptable oil; providing a stanol ester; providing a crystal fat inhibitor and an emulsifier; admixing said oil, stanol ester, crystal fat inhibitor and emulsifier; heating the admixture to a temperature of from about 100 to about 150 F. to form a heated oil adding the heated oil to said aqueous system. More preferably the admixture is heated to a temperature of from about 120 to about 140 F.

In order to make the salad dressings of the present invention any suitable food grade oils may be employed including soybean, sunflower, corn, vegetable and the like. The oils are typically less than 50% of the salad dressing, more preferably from about 25 to about 40 weight percent.

The following examples are provided to further illustrate the claimed invention, but not limit the invention to the examples provided below. Unless noted otherwise, all weights are presented in weight percent.

EXAMPLE 1

The following examples are examples of a stable salad dressings containing sufficient stanol esters to provide an effective amount of stanol ester to reduce cholesterol when a serving of 30 grams is used. Sorbitan tristearate could be substituted for Caprol ET or combined with Caprol ET in each of the formulations. All of the following formulations additionally contain seasoning, preservatives, coloring, flavoring as desired for taste.

RANCH DRESSING FORMULATION

| Ingredients Composition Ingredients | Typical Formula Percent | Range of Ingredients Percent |
| --- | --- | --- |
| Soybean oil, salad oil | 40.000 | 30–50 |
| Vinegar, | 6.000 | 4.0–10 |
| stanol esters | 5.750 | 3.0–10 |
| Sugar, | 4.000 | 3.0–6.0 |
| Cultured buttermilk solids | 1.000 | 0.5–3.0 |
| Caprol ET | 0.500 | 0.2–2.0 |
| Egg yolk, | 0.360 | 0–2.0, |

RANCH DRESSING FORMULATION -continued

| Ingredients Composition Ingredients | Typical Formula Percent | Range of Ingredients Percent |
| --- | --- | --- |
| Xanthan gum | 0.300 | 0.15–0.5 |
| Polysorbate 60 (Tween 60) | 0.300 | 0–0.30 |
| Propylene glycol alginate | 0.160 | 0.05–0.30 |
| Polysorbate 80 (Tween 80) | 0.160 | 0.0–0.30 |
| Water | 36.568 | To 100% |
| Total | 100.000 | 100 |

FRENCH STYLE DRESSING FORMULATION

| Ingredients Composition Ingredients | Typical Formula Percent | Range of Ingredients Percent |
| --- | --- | --- |
| Soybean oil | 35.000 | 25–40 |
| Sugar | 14.000 | 8.0–20 |
| Vinegar | 6.000 | 4.0–10 |
| Tomato Paste (~31% solids) | 6.000 | 3.0–10 |
| Stanol esters | 5.600 | 3.0–10 |
| Caprol ET | 0.500 | 0.1–2.0 |
| Egg yolk | 0.350 | 0–2.0 |
| Polysorbate 60 | 0.300 | 0–0.3 |
| Xanthan gum | 0.200 | 0.1–0.5 |
| Propylene glycol alginate | 0.100 | 0–0.5 |
| Polysorbate 80 | 0.100 | 0.0–0.3 |
| Water | 28.831 | To 100% |
| Total | 100.000 | |

THOUSAND ISLAND DRESSING FORMULATION

| Ingredients Composition Ingredients | Typical Formula Percent | Range of Ingredients Percent |
| --- | --- | --- |
| Soybean oil | 35.000 | 25–40 |
| Sweet relish | 10.00 | 4.0–15 |
| Sugar | 9.000 | 4.0–15 |
| Vinegar | 6.000 | 4.0–10 |
| Stanol esters | 5.600 | 4.0–10.0 |
| Tomato paste | 5.000 | 2.0–8.0 |
| Egg yolk, liquid, 10% salt | 0.400 | 0–1.0 |
| Caprol ET | 0.500 | 0.1–1.5 |
| Polysorbate 60 | 0.300 | 0.1–0.30 |
| Xanthan gum | 0.300 | 0.1–0.5 |
| Propylene glycol alginate | 0.130 | 0.05–0.5 |
| Polysorbate 80 | 0.100 | 0.0–0.3 |
| Water | 25.700 | To 100% |
| Total | 100.000 | 100 |

CREAMY ITALIAN DRESSING FORMULATION

| Ingredients Composition Ingredients | Typical Formula Percent | Range of Ingredients Percent |
| --- | --- | --- |
| Soybean oil | 33.000 | 25–40 |
| Vinegar | 9.200 | 5.0–15 |
| Sugar | 6.000 | 3.0–10 |

-continued

CREAMY ITALIAN DRESSING FORMULATION

| Ingredients Composition Ingredients | Typical Formula Percent | Range of Ingredients Percent |
|---|---|---|
| Stanol esters | 5.750 | 4.0–8.0 |
| Diced sweet Bell peppers, dried | 0.600 | 0.2–1.5 |
| Caprol ET | 0.520 | 0.1–1.0 |
| Buttermilk | 0.500 | 0–1.0 |
| Eggs | 0.400 | 0–1.0 |
| Xanthan gum | 0.320 | 0.1–0.5 |
| Polysorbate 60 | 0.300 | 0–0.30 |
| Modified food starch | 0.250 | 0–1.0 |
| Titanium dioxide | 0.200 | 0–0.5 |
| Propylene glycol alginate | 0.160 | 0.05–0.5 |
| Polysorbate 80 | 0.090 | 0.0–0.30 |
| Water | 37.330 | To 100% |
| Total | 100.000 | |

REDUCED FAT RANCH DRESSING FORMULATION

| Ingredients Composition Ingredients | Typical Formula Percent | Range of Ingredients Percent |
|---|---|---|
| Soybean oil | 24.500 | 15–28 |
| Vinegar | 8.000 | 4.0–12 |
| Stanol esters) | 5.750 | 4.0–8.0 |
| Ranch seasoning | 5.000 | 3.0–8.0 |
| Sugar | 4.000 | 2.0–7.0 |
| Cultured buttermilk solids | 1.400 | 0.2–3.0 |
| Caprol ET | 0.650 | 0.1–1.50 |
| Lemon juice concentrate | 0.450 | 0–2.0 |
| Xanthan gum | 0.450 | 0.1–0.60 |
| Egg yolk | 0.350 | 0–1.0 |
| Polysorbate 60 | 0.300 | 0.1–0.30 |
| Modified food starch | 0.300 | 0–1.60 |
| Propylene glycol alginate | 0.215 | 0.05–0.5 |
| Distilled mono- & di-glyceride | 0.200 | 0–1.50 |
| Water | 46.765 | To 100% |
| Total | 100.000 | |

Comparative Examples

The following examples demonstrate formulations which were found to be unstable when refrigerated. However, when the stanol ester was removed and the formulation reconstituted, the formulation was once again stable, even when refrigerated.

Ranch Style Salad Dressing

| Ingredients Composition Ingredients | Unstable Formula Percent | Stable Formula Percent |
|---|---|---|
| Soybean oil, salad oil | 40.000 | 45.750 |
| Vinegar | 6.000 | 6.000 |
| stanol esters | 5.750 | 0.000 |
| Sugar, | 4.500 | 4.500 |
| seasoning | 4.000 | 4.000 |
| Cultured buttermilk solids | 1.000 | 1.000 |
| Cooking salt | 0.400 | 0.400 |
| Egg yolk, liquid, 10% salt | 0.360 | 0.360 |

-continued

Ranch Style Salad Dressing

| Ingredients Composition Ingredients | Unstable Formula Percent | Stable Formula Percent |
|---|---|---|
| Xanthan gum | 0.340 | 0.340 |
| Propylene glycol alginate | 0.160 | 0.160 |
| Preservatives, colorings vitamins and seasonings | Balance of formulation | Balance of formulation |
| Water | 36.988 | 36.988 |
| Total | 100.000 | 100.000 |

FRENCH STYLE DRESSING FORMULATION

| Ingredients Composition Ingredients | Unstable formula Percent | Stable formula Percent |
|---|---|---|
| Soybean oil, salad oil | 35.000 | 40.600 |
| Sugar, fine granulated | 17.500 | 17.500 |
| Vinegar, 120 grain, white distilled | 6.000 | 6.000 |
| Tomato Paste (~31% solids) | 6.000 | 6.000 |
| Stanol esters | 5.600 | 0.000 |
| Egg yolk, liquid, 10% salt | 0.350 | 0.350 |
| Xanthan gum | 0.200 | 0.200 |
| Propylene glycol alginate | 0.100 | 0.100 |
| Preservatives, colorings vitamins and seasonings | Balance of formulation | Balance of formulation |
| Water | 26.231 | 26.231 |
| Total | 100.000 | 100.000 |

TYPICAL THOUSAND ISLAND DRESSING FORMULATION

| Ingredients Composition Ingredients | Unstable formula Percent | Stable formula Percent |
|---|---|---|
| Soybean oil | 35.000 | 40.600 |
| Sweet relish | 11.00 | 11.000 |
| Sugar, fine granulated | 9.000 | 9.000 |
| Vinegar, 120 grain, white distilled | 6.000 | 6.000 |
| Stanol esters | 5.600 | 0.000 |
| Tomato paste (~31% solids) | 5.000 | 5.000 |
| Egg yolk, liquid, 10% salt | 0.400 | 0.400 |
| Xanthan gum | 0.300 | 0.300 |
| Propylene glycol alginate | 0.150 | 0.150 |
| Preservatives, colorings vitamins and seasonings | Balance of formulation | Balance of formulation |
| Water | 25.580 | 25.580 |
| Total | 100.000 | 100.000 |

TYPICAL CREAMY ITALIAN DRESSING FORMULATION

| Ingredients Composition Ingredients | Unstable formula Percent | Stable formula Percent |
|---|---|---|
| Soybean oil, salad oil | 33.000 | 38.750 |
| Vinegar | 9.200 | 9.200 |
| Sugar | 6.000 | 6.000 |

-continued

TYPICAL CREAMY ITALIAN DRESSING FORMULATION

| Ingredients Composition Ingredients | Unstable formula Percent | Stable formula Percent |
|---|---|---|
| Stanol esters | 5.750 | 0.000 |
| Buttermilk | 0.500 | 0.500 |
| Eggs | 0.400 | 0.400 |
| Xanthan gum | 0.320 | 0.320 |
| Modified food starch | 0.250 | 0.250 |
| Water | 38.240 | 38.240 |
| Preservatives, colorings vitamins and seasonings | Balance of formulation | Balance of formulation |
| Total | 100.000 | 100.000 |

TYPICAL LIGHT RANCH DRESSING FORMULATION

| Ingredients composition Ingredients | Unstable formula Percent | Stable formula Percent |
|---|---|---|
| Soybean oil, salad oil | 24.500 | 30.260 |
| Vinegar, | 8.000 | 8.000 |
| Stanol esters) | 5.750 | 0.000 |
| Seasoning | 5.000 | 5.000 |
| Sugar | 4.000 | 4.000 |
| Cultured buttermilk solids | 1.400 | 1.400 |
| Lemon juice concentrate | 0.450 | 0.450 |
| Xanthan gum | 0.450 | 0.450 |
| Egg yolk | 0.350 | 0.350 |
| Polysorbate 60 | 0.300 | 0.300 |
| Modified food starch | 0.300 | 0.300 |
| Propylene glycol alginate | 0.215 | 0.215 |
| Preservatives, colorings vitamins and seasonings | Balance of formulation | Balance of formulation |
| Water | 47.615 | 47.615 |
| Total | 100.000 | 100.000 |

We claim:

1. A liquid food comprising:

a cholesterol reducing amount of a sterol ester;

an emulsifier or a hydrocolloid; and an effective amount of a fat crystal inhibitor selected from the group consisting of rolyglycerol esters of fatty acids, sorbitan esters of fatty acids, and polysorbates made from the reaction product of monoglycerides or sorbitan esters and ethylene oxides;

to provide a stable emulsion.

2. The food of claim 1 which is a salad dressing.

3. The food of claim 2 wherein the emulsifier is selected from the group consisting of polysorbate 80, and polysorbate 60.

4. The food of claim 3 wherein the emulsifier level is from about 0.01 to about 1.5 weight percent.

5. The food of claim 3 wherein the crystal fat inhibitor level is from about 0.1 to about 3.0 weight percent.

6. The food of claim 2 wherein the hydrocolloid is selected from the group consisting of xantham gum, propylene glycol alginate, modified food starches and cellulose derivatives.

7. The food of claim 2 which contains from about 0.5 to about 1.5 grams of sterol ester per serving.

8. The food of claim 1 wherein the emulsifier is selected from the group consisting of polysorbate 80, and polysorbate 60.

9. The food of claim 1 wherein the hydrocolloid is selected from the group consisting of xantham gum, propylene yiycol alginate, modified food starches and cellulose derivatives.

10. The food of claim 1 which contains from about 0.5 to about 1.5 grams of sterol ester per serving.

11. The food of claim 1 which remains stable when refrigerated.

12. The food of claim 1 wherein the emulsifier level is from about 0.01 to about 1.5 weight percent.

13. The food of claim 1 wherein the crystal fat inhibitor level is from about 0.1 to about 3.0 weight percent.

* * * * *